United States Patent
Krumwiede et al.

(10) Patent No.: US 9,398,824 B2
(45) Date of Patent: Jul. 26, 2016

(54) CANTILEVER-STYLE WINE BUCKET AND BOTTLE HOLDER

(71) Applicant: JEK2, LLC, Mount Prospect, IL (US)

(72) Inventors: Judi Krumwiede, Mount Prospect, IL (US); James Krumwiede, Mount Prospect, IL (US)

(73) Assignee: JEK2, LLC, Mount Prospect, IL (US)

( * ) Notice: Subject to any disclaimer, the term of this patent is extended or adjusted under 35 U.S.C. 154(b) by 32 days.

(21) Appl. No.: 14/319,263

(22) Filed: Jun. 30, 2014

(65) Prior Publication Data

US 2015/0374155 A1    Dec. 31, 2015

(51) Int. Cl.
*A47B 73/00* (2006.01)
*A47B 43/00* (2006.01)
*A47B 47/00* (2006.01)
(Continued)

(52) U.S. Cl.
CPC ............ *A47G 23/0241* (2013.01); *A47B 55/02* (2013.01); *A47B 73/002* (2013.01); *A47F 5/01* (2013.01); *A47G 7/044* (2013.01);
(Continued)

(58) Field of Classification Search
CPC .............. A47G 23/02; A47G 23/0225; A47G 23/0241; A47G 23/025; A47G 23/0266; A47G 23/0316; A47G 25/0614; A47G 25/0642; A47G 7/00; A47G 7/042; A47G 7/044; A47G 7/045; A47G 25/24; A47F 7/0078; A47F 7/28; A47F 7/283; A47F 5/01; A47F 5/13; A47F 7/148; A01G 9/02; A47H 27/00; A47B 73/00; A47B 73/002; A47B 73/008; A47B 55/02; A47J 47/16; F16M 13/02; F16M 13/022

USPC ............ 211/74, 75, 193, 181.1, 85.31, 88.01, 211/85.18, 85.23, 88.03, 126.5, 133.5, 211/133.6, 119; 248/311.2, 302, 309.1, 248/317, 339, 340, 303, 312.1; D7/619.1, D7/603, 620
See application file for complete search history.

(56) References Cited

U.S. PATENT DOCUMENTS

| 433,966 | A | * | 8/1890 | Spofford | ............ | A47G 23/0241 |
| | | | | | | 248/141 |
| 1,584,857 | A | * | 5/1926 | Hobbs | ................ | A47G 23/0241 |
| | | | | | | 215/395 |

(Continued)

FOREIGN PATENT DOCUMENTS

| AU | 200048622 B2 | 1/2001 |
| CA | 2112541 | 7/1994 |

(Continued)

OTHER PUBLICATIONS

Three photographs of a wine holder observed in Europe circa Nov. 2013.

*Primary Examiner* — Jennifer E Novosad
(74) *Attorney, Agent, or Firm* — Seyfarth Shaw LLP; David Klein (57) ABSTRACT

A cantilever-style wine server for mounting to a table has a unitary frame composed of shaped metal bars, such as shaped rods with circular cross-sections. The frame includes a holder that serves as a receptacle for a wine bucket, insulator, and/or a bottle, and a mount/handle that serves as both a cantilever mount to the side of a table and as a handle to transport the server. The holder and mount/handle are unified as a single frame, such as by multiple welds. The frame has a flat base, enabling the server (even when fully loaded) to be set down on a flat surface. A removable cover may center a wine bottle in the holder.

21 Claims, 7 Drawing Sheets

(51) Int. Cl.

| | |
|---|---|
| *A47B 57/00* | (2006.01) |
| *A47F 5/08* | (2006.01) |
| *A47G 7/02* | (2006.01) |
| *A47G 29/00* | (2006.01) |
| *A47G 23/02* | (2006.01) |
| *F16M 13/02* | (2006.01) |
| *A47B 55/02* | (2006.01) |
| *A47G 7/04* | (2006.01) |
| *A47F 5/01* | (2006.01) |

(52) U.S. Cl.
 CPC ............ *A47G 7/045* (2013.01); *A47G 23/0225* (2013.01); *F16M 13/022* (2013.01); *A47G 2023/0283* (2013.01)

(56) References Cited

U.S. PATENT DOCUMENTS

| | | | | |
|---|---|---|---|---|
| 1,782,962 | A * | 11/1930 | Hobbs | A47G 23/0241 206/446 |
| 1,936,517 | A * | 11/1933 | Maine | F25D 23/126 211/106 |
| 1,957,353 | A * | 5/1934 | Piersall | A47J 47/20 248/212 |
| 2,279,442 | A * | 4/1942 | Burns | B60N 3/103 248/311.2 |
| 2,318,930 | A * | 5/1943 | Dietrich | B44D 3/123 211/119 |
| 2,331,511 | A | 10/1943 | Schiffman | |
| 2,562,443 | A * | 7/1951 | Barbour | A24F 19/0092 211/74 |
| 3,212,742 | A * | 10/1965 | Pavoni | D06F 81/003 248/117.1 |
| 3,391,891 | A * | 7/1968 | Garden | B60N 3/102 108/135 |
| 3,490,726 | A * | 1/1970 | Mills | A01K 5/01 248/312.1 |
| 3,734,439 | A * | 5/1973 | Wintz | A47G 23/0241 131/241 |
| D254,648 | S | 4/1980 | Rosselli | |
| 4,230,362 | A | 10/1980 | Euwema et al. | |
| 4,248,397 | A * | 2/1981 | Casper | A47G 23/0216 211/81 |
| 4,248,478 | A | 2/1981 | Aron | |
| 4,362,333 | A | 12/1982 | Cohen | |
| 4,418,883 | A | 12/1983 | Cohen | |
| D279,533 | S | 7/1985 | Gildart | |
| 4,598,891 | A * | 7/1986 | Hanert | A63B 71/0045 211/119 |
| 4,629,153 | A * | 12/1986 | Marcum | A47G 23/0266 108/46 |
| 4,672,703 | A * | 6/1987 | Frazier | A47C 21/003 211/119 |
| D297,695 | S | 9/1988 | Dessart | |
| D307,851 | S * | 5/1990 | Polidoros | D34/6 |
| D338,122 | S * | 8/1993 | Emalfarb | D6/513 |
| D353,790 | S * | 12/1994 | Emalfarb | D11/155 |
| 5,390,443 | A * | 2/1995 | Emalfarb | A47G 7/044 211/119 |
| 5,609,318 | A | 3/1997 | Scheh | |
| 5,711,502 | A * | 1/1998 | Emalfarb | A47H 27/00 248/302 |
| 5,865,325 | A * | 2/1999 | Comstock | A47K 10/08 211/119.009 |
| 6,027,083 | A * | 2/2000 | Chang | A47G 7/044 248/153 |
| 6,065,727 | A * | 5/2000 | Fitzgerald | A47C 20/041 248/302 |
| 6,250,482 | B1 * | 6/2001 | Want | A61G 7/0503 211/133.4 |
| D468,014 | S * | 12/2002 | Girod | D24/122 |
| D474,652 | S | 5/2003 | Chan | |
| 7,284,737 | B2 | 10/2007 | Kane | |
| 7,717,385 | B2 | 5/2010 | Saffray | |
| 8,430,366 | B2 | 4/2013 | Tincher | |
| 2001/0032915 | A1 * | 10/2001 | Clifford | A47G 23/0225 248/311.2 |

FOREIGN PATENT DOCUMENTS

| | | |
|---|---|---|
| CN | 201854884 | 6/2011 |
| DE | 850068 | 9/1952 |
| DE | 8714841 U1 | 12/1987 |
| DE | 8804297 U1 | 5/1988 |
| DE | 29510895 U1 | 9/1995 |
| DE | 29819669 U1 | 4/1999 |
| DE | 20215022 U1 | 12/2002 |
| EP | 1974636 A1 | 1/2008 |
| FR | 2626457 A1 | 8/1989 |
| GB | 2237182 A | 1/1991 |
| WO | 98/53722 | 12/1998 |
| WO | 2008/000690 A1 | 1/2008 |

* cited by examiner

CANTILEVER-STYLE WINE BUCKET AND BOTTLE HOLDER

BACKGROUND

When serving wine at a table, whether decanted or pouring directly from the bottle, the wine bottle may be stored at the table in an ice bucket or insulator. To avoid taking up table space and to reduce the chances that the bottle will be knocked over during the meal, the bucket may be placed on a stand adjacent to the table or attached to the side of the table itself. The present invention relates to an improved cantilever-style holder for a wine bucket or the wine bottle itself.

SUMMARY OF THE DISCLOSURE

In one aspect of the present disclosure, a table-mountable server has a frame. The frame may be a unitary frame, presenting a generally flat base in one form, and includes a holder portion connected to a mount portion. The holder portion comprises a ring shape, with laterally spaced first and second supports, and at preferably in this form at least one crossbar. The first support includes a first inside leg and a first outside leg, each connected at one end to the ring and connected at the other end to a section of the first support forming part of the flat base. Likewise, the second support comprises a second inside leg and a second outside leg, each connected at one end to the ring and connected at the other end to a section of the second support forming part of the flat base. Each crossbar in this version is connected at one end to the first support and at the other end to the second support.

The mount portion of this embodiment comprises a first arm, a second arm, a first contact bar, and a second contact bar. The first arm partially abuts and is connected to the first inside leg. The second arm, laterally spaced from the first arm, partially abuts and is connected to the second inside leg. The mount portion includes a top bracket comprising the first contact bar, and portions of the first arm and the second arm extending away the ring of the holder portion. The first contact bar connects a first end of the first arm to a first end of the second arm. The mount portion also includes a bottom bracket comprising the second contact bar and portions of the first arm and the second arm extending away from the holder portion along the flat base. Portions of each arm form part of the flat base before curving up-and-away from the flat base, the second contact bar connecting a second end of the first arm to a second end of the second arm. The bottom bracket extends further away from the holder portion than the top bracket, that first contact bar of the top bracket acting as a fulcrum of the cantilever-style mount. A further embodiment adds a cover or adapter that that may locate and hold a bottle in place in the holder portion. Parallel cover arms support opposite sides of a cover ring with a diameter sized to envelope a bottle. The cover arms are connected to a cover ring. The cover or adapter may removably latch or clasp to the holder ring of the holder portion.

As another embodiment, a cover or adapter is added to locate and hold a bottle in place in the holder portion. The cover may be constructed from a shaped, stamped, and/or folded metal sheet, or may be molded. An inner edge of the cover has a diameter sized to envelope a bottle, and may be concentric with the holder ring of the holder. The outer edge is concentric with the holder, with one edge cropped to abut the support arms of the mount portion

BRIEF DESCRIPTION OF THE DRAWINGS

For a further understanding of the attributes, advantages and aspects of the present disclosure, reference is now made to the following description taken in conjunction with the accompanying drawings, in which.

DETAILED DESCRIPTION

Cantilever designs for mounting a bucket to a table rely on gravity-generated torque to anchor the bucket holder. One example is U.S. Pat. No. 5,609,318 to Scheh, which holds the bucket with a single ring and uses a three-point anchor attachment (two points on top, one point on bottom) to mount the ring on the edge of the tabletop. While simple to attach and remove from the table, the single ring has a single point of contact with mount, stressing the structure as the weight of the bucket acts upon the joint. This result in the ring bending under load at the joint and increases the likelihood that the joint will fail over time. Also, the three-point anchor attachment, although padded, produces localized forces on the table which can damage soft wood and increase the chances of cracking glass tops. A similar design is illustrated in U.S. Design Pat. No. D474,652S to Chan, which also relies on a single ring to support the torque created by the bucket.

Designs such as that disclosed in Published U.K. Patent Application GB 2237182A to McClements add a lower ring to provide a base for the bucket. While an improvement over a single ring, the downward force of the bucket produces a sheer force on the lower ring, bending the lower ring at the point of contact with the mount. As the lower ring bends under load, the bucket may shift, destabilizing the mount.

Figure 1:
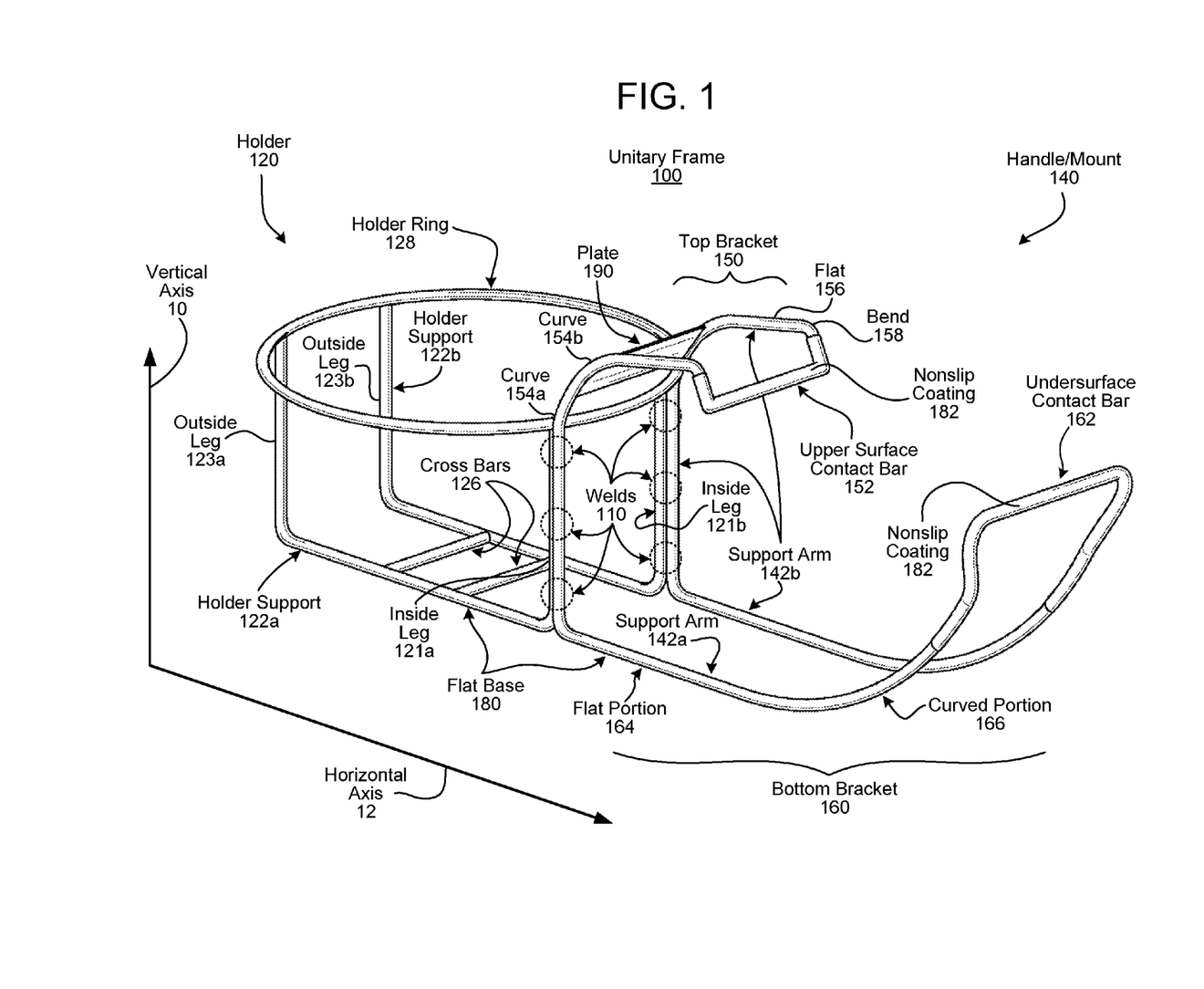
FIG. 1 is a perspective view of a cantilever-style wine bucket and bottle holder made in accordance with an aspect of the present invention.
Figure 2:
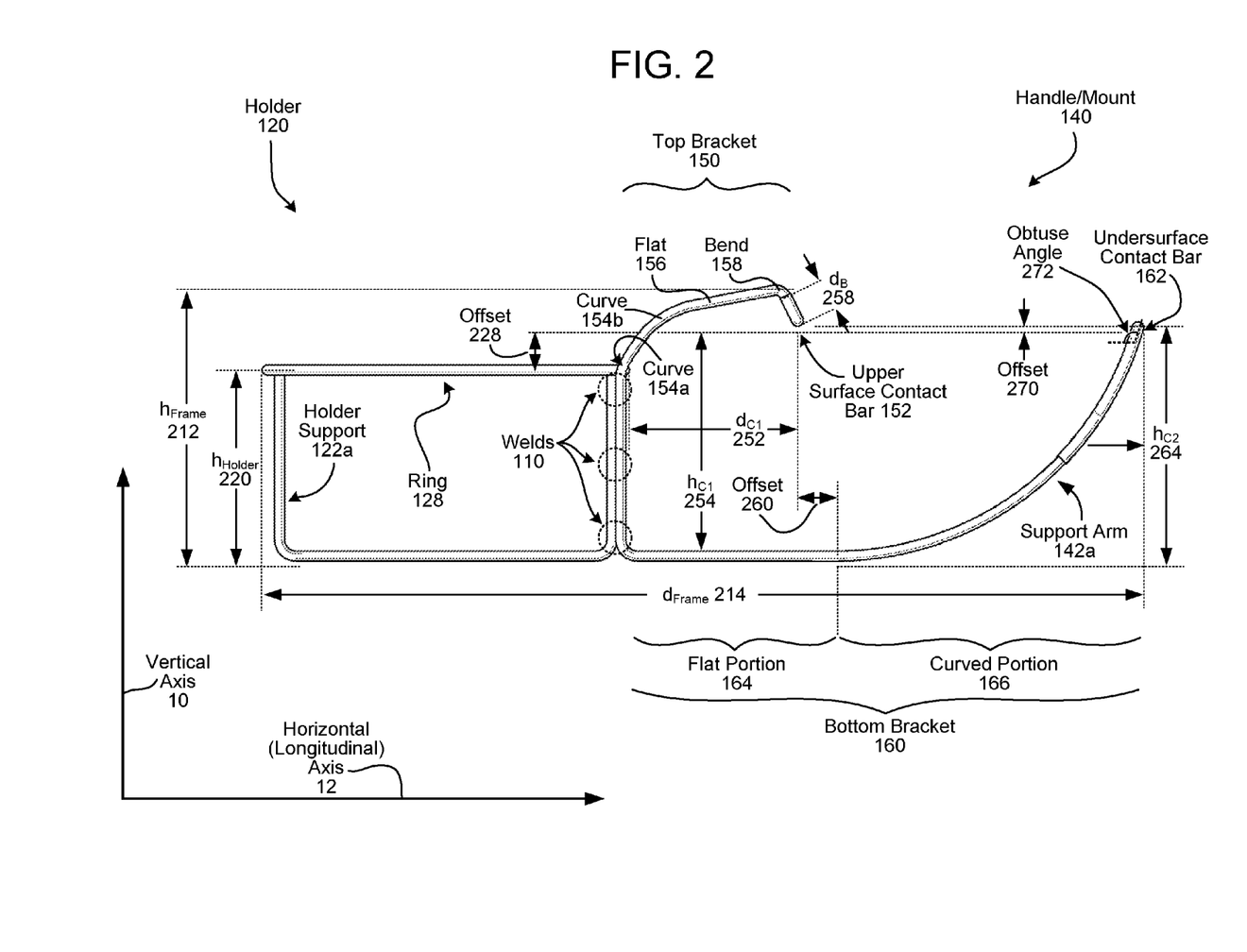
FIG. 2 is a side view of the holder of FIG. 1.
Figure 3:
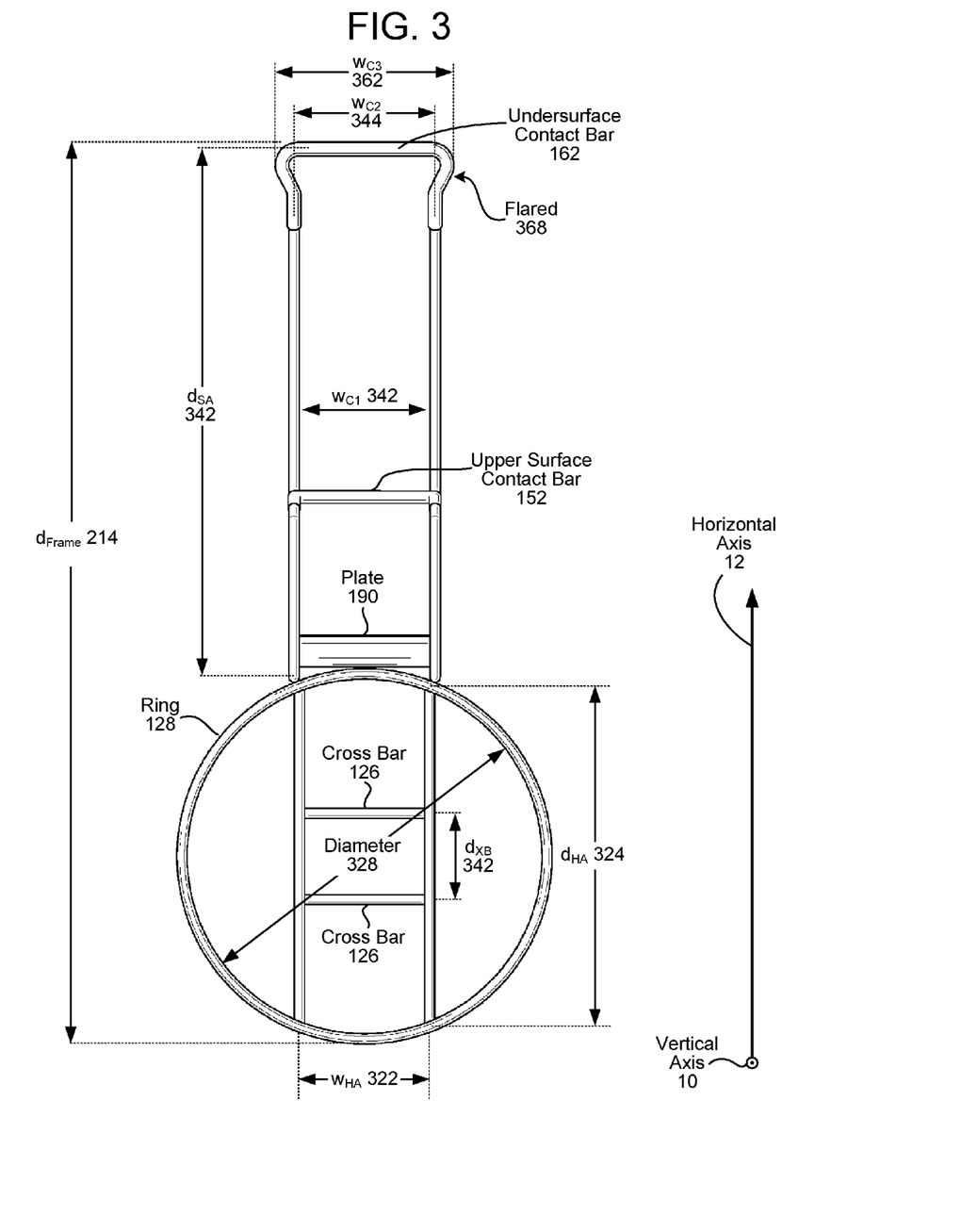
FIG. 3 is a top plan view of the holder of FIG. 1.
Figure 10:
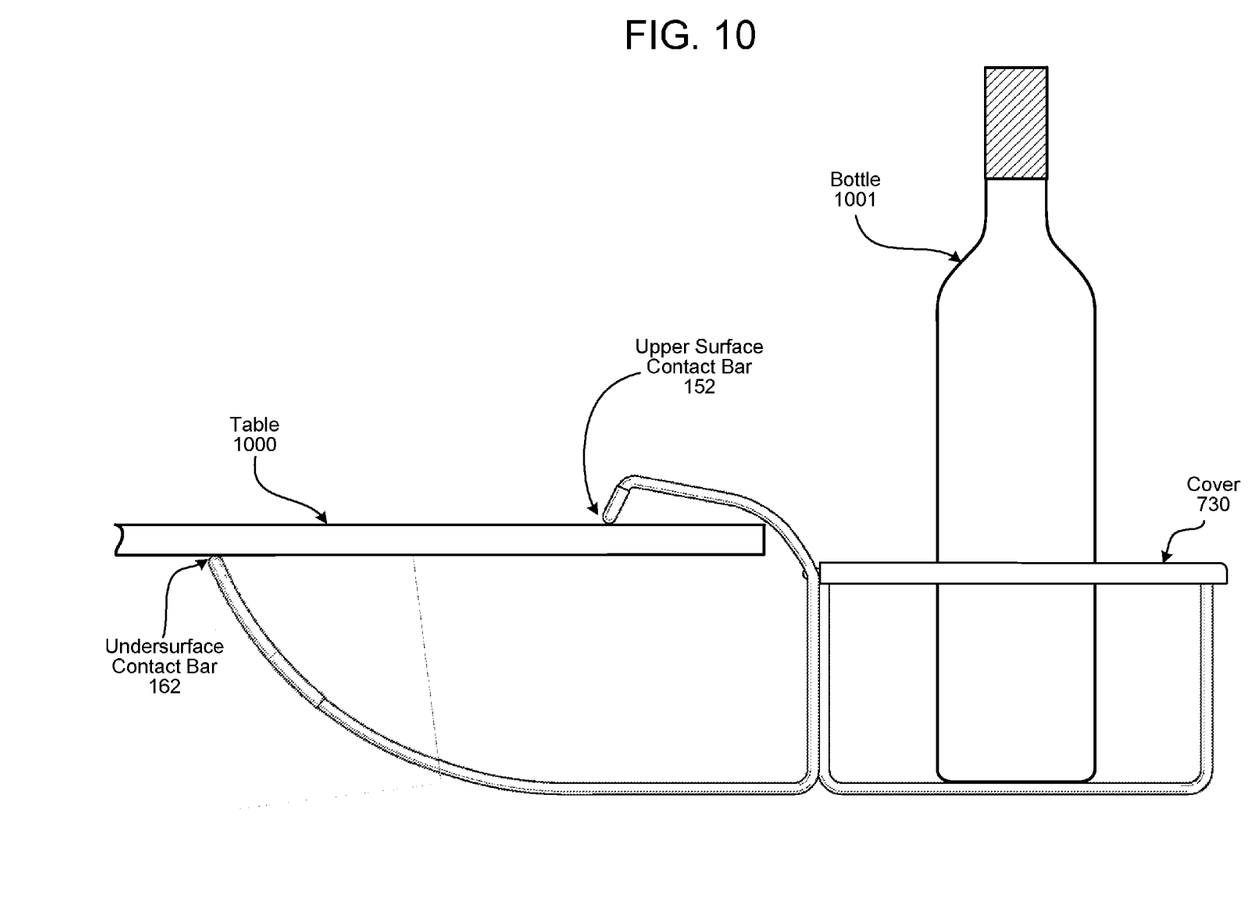
FIG. 10 illustrates the holder of FIG. 1 as it would be used on a table.

Turning to the present application for an improved cantilever-type holder, FIGS. 1 to 3 illustrate a cantilever-style holder or server comprising a unitary frame 100 composed of shaped metal bars, such as rod stock with circular cross-sections. The frame 100 comprises a holder 120 that serves as a receptacle for a wine bucket and/or a bottle. It has a mount/handle 140 that serves as both a cantilever mount and a handle. The holder 120 and mount/handle 140 are unified as a single frame, such as by multiple welds 110. The welding could be continuous, of course, and those of skill will recognize other ways to join elements of the frame, or form the frame as a single piece (as by using additive manufacture, colloquially referred to as "3D printing"). The frame 100 has a flat base 180, enabling the frame 100 (even when fully loaded) to be set down on a flat surface. If set on a flat surface, the frame may be stable so long as the mass of the load, such as a bucket, ice, and a bottle, are centered relative to longitudinal axis down a middle of the frame. At a table, the mount/ handle 140 detachably mounts the frame 100 to the edge of the table top, or any other convenient flat, horizontal surface. This is illustrated in FIG. 10.

The holder 120 of the illustrated embodiment, which is but one form or aspect of the invention, comprises a continuous ring 128 fixedly connected to two laterally-spaced supports 122a, 122b that may be symmetrical to each other. The laterally-spaced supports 122a, 122b have a squared-off U-shape, with a base that forms part of the flat base 180 of the frame 100. More specifically, each support 122a, 122b is three-sided quadrilateral with the fourth side being open (and fixedly connected to the ring 128). The side of the quadrilateral opposite the open side forms part of the flat base 180. The two other sides of each quadrilateral support 122 form opposing support legs, the first support 122a having an inside leg 121a abutting the mount 140 and an outside leg 123a, and the second support 122b having an inside leg 121b abutting the mount 140 and an outside leg 123b. Each leg 121/123 is fixedly connected at one end to the ring 128. As illustrated, all of the legs are vertical and of equal length, providing each arm a rectangular shape. Other support shapes may be used, such symmetric legs (121, 123) that are angled, with each support 122 forming an isosceles trapezoid shape. As an alternative to the holder ring 128 being parallel to the flat base 180, the holder ring may be oriented at an angle, in which case the length of the legs of holder supports 122a, 122b may be different and the legs may be asymmetric.

As illustrated in this embodiment, each end of the laterally-spaced supports 122a, 122b is welded to an underside of the ring 128. That is, one end of each of legs 121a, 121b, 123a, and 123b are welded to the underside of the ring 128.

The base of the supports 122 form part of the flat base 180. The distance between the two laterally-spaced supports 122a, 122b ($w_{C1}$ 342 in FIG. 3) provides the frame 100 with lateral stability when set down on a flat surface. Two parallel, laterally-spaced crossbars 126 are fixedly connected to the supports 122a, 122b, each crossbar having one end welded to the first support 122a, and having another end welded to the second support 122b. The spacing between the crossbars 126 ($d_{XB}$ 324 in FIG. 3) mitigates any twisting force or force applied to the supports 122a, 122b, thereby stiffening construction. The crossbars 126 may be symmetrically aligned around a center of the base of the holder 120. The crossbars may serve as a "stop" for a bottle centered in the holder 120, such that the crossbars should be spaced ($d_{XB}$ 342) close enough together to serve as a support for a bottle, while being far enough apart to mitigate twisting. In one alternative, a single crossbar 126 or more than two crossbars 126 may be used.

The mount/handle 140 comprises two support arms 142a, 142b connected at an upper surface contact bar 152 and an undersurface contact bar 162. The mount/handle 140 may be formed as a continuous loop, and bent into shape to form the support arms 142a, 142b and contact bars 152, 162 (e.g., a single metal rod with both-ends welded to each other, or two rods welded together in the middle of the contact bars 152, 162). In the alternative, the rod or rods forming the mount/handle 140 may be bent into shape and then joined to form the continuous loop.

A section of the support arms 142a, 142b abut the inside holder legs 121a, 121b. As illustrated, this section is parallel to the vertical axis 10 and perpendicular to the flat base 180. Other orientations are possible, with each arm 142 arranged at a supplementary angle to the corresponding leg (such that the angle of inside leg 121 relative to the flat base 180 plus the angle of an abutting portion of support arm 142 relative to the flat base 180 will total one-hundred-eighty degrees).

The inside legs 121 may be welded to the abutting portion of the arms 142 (welds 110) at multiple points (e.g., three weld points on each side in FIGS. 1 and 2). At least two spot-weld points 110 are used on each side, although as noted above, one-or-more continuous weld may also be used on each side, fixedly connecting the abutting bars/rods. The lateral distance between support arms 142a and 142b ($W_{HA}$ 322 in FIG. 3) may be slightly wider than the lateral distance between the inside legs 121a and 121b ($W_{C2}$ 344 in FIG. 3). For example, if metal rods are used to form the frame 100, this difference in distance may be equal to the twice the radius of the rods. This allows the holder ring 128 to nest slight further back into the handle 140 (reducing the moment of force relative to the upper surface contact bar 152) and widens the handle/mount 140.

Extending away from the holder 120, the mount/handle 140 forms a top bracket 150 and a bottom bracket 160. The portion of the arms 142a, 142b forming top bracket 150 curve away (e.g., curves 154a, 154b) the top of the holder 120. The curves 154a, 154b lead to a flat portion 156, after which the arms 142a, 142b bend downward (bend 158; downward relative to the vertical axis 10 and/or flat base 180), where the arms 142a, 142b of the two sides connect to the upper-surface contact bar 152, bridging the two sides of the top bracket 150. The upper-surface contact bar 152 serves as the fulcrum of cantilever, transferring torque created by the downward gravitational force on the holder 120 to the undersurface contact bar 162 of the bottom bracket 160.

The bottom bracket 160 extends away from the holder 120, and includes a flat portion 164, a curved portion 166, and the undersurface contact bar 162. The bottom of the flat portion 164 is coplanar with the bottom of the holder 120, providing part of the flat base 180. From the flat portion 164, the support arms 142a, 142b curve upward (relative to vertical axis 10 and/or flat base 180) and then connect to the undersurface contact bar 162, bridging the two sides of the bottom bracket 160.

The upper surface contact bar 152 and the undersurface contact bar 162 are oriented parallel to each other, but perpendicular to a longitudinal-axis (parallel to the horizontal axis 12) of the frame 100. Both of the contact bars 152, 162 may be coated with a nonslip coating 182, such a natural rubber, synthetic rubber, latex, vinyl, elastic polymer, or silicone, to increase friction against the surfaces of the table and enhance grip when carried by the contact bars 152, 162, as well as protect the table surface. Element 182 could also be applied as a separate piece (e.g., a split tube attached over the bars 152, 162). Specific materials may be characterized by more than one of these categories, such as an elastic polymer that is a synthetic rubber.

Unlike some of the ring-based prior art designs, the holder 120 is rigid, with the forces being transferred to the mount/handle 140 for distribution. The short top bracket 150 and long bottom bracket 160 may both flex to absorb the load, while the holder 120 provides a stable platform. In addition, the contact bars 152, 162 distribute the forces of the load across a larger surface area than the prior art anchor points, improve grip/friction, and strengthen the frame 100.

As demonstrated in FIG. 2 by offset 270, the end of the undersurface contact bar 162 may be higher (relative to the flat base 180 and vertical axis 10) than the end of the upper surface contact bar 152. These relative positions may change when the frame 100 is under load (i.e., a mass is placed in the holder 120) and the top bracket (150) and bottom bracket (160) flex. Depending upon the thickness of the tabletop that constitutes the intended use for the frame 100, the offset 270 may be altered, such as positioning the undersurface contact bar 162 below the upper surface contact bar 152 for use with thicker tabletops.

The angle of the handle support arms 142a, 142b where they join the undersurface contact bar 162, relative to the flat base, may be an oblique, obtuse angle (272), such as an angle between one hundred ten and one hundred thirty five degrees relative to a plane of the flat base 180. When under load, the obtuse angle 272 facilitates the undersurface contact bar 162 pushing away from the upper surface contact bar 152, promoting flex along the curved portion 166 of the bottom bracket 160 while reducing bending of the flat portion 164 near the junction with the holder 120.

The diameter 328 of the holder ring, the length $d_{C1}$ 252 of the top bracket, and the distance from the upper surface contact bar 152 to the undersurface contact bar 162 are arranged at an approximate ratio of two-one-two, balancing the upward force on the bottom bracket 160 of the cantilever relative to downward force and moment at the fulcrum (bar 152) while providing sufficient unloaded torque to maintain the frame 100 in place (on the side of the table) if the load is removed from the holder 120 (e.g., if there is no bucket in the holder 120 and the wine bottle is removed).

The contact surface of the upper surface contact bar 152 is positioned above the top of the ring 128 by an offset of 228. This offset 228 may be adjusted, depending in part upon the depth of the holder 120 ($h_{Holder}$ 220 in FIG. 2), so that the estimated center of mass of a load in the holder 120 (e.g., with ice bucket, wine bottle, etc.) is at or below the bottom of the upper surface contact bar 152 (i.e., at or below the top surface of the table) to promote torsional stability when mounted (e.g., stability around the longitudinal axis). Torsional stability is also improved by the flare (368) of the support arms 142a, 142b of the handle/mount 140, increasing a length ($W_{C3}$ in FIG. 3) of the undersurface contact bar 162.

The offset 260 between the upper surface contact bar 152 and the transition between the flat portion 164 and curved portion 166 of the bottom bracket 160, relative to the longitudinal axis, depends in part on the radius of curvature of the curved portion 166, the depth $h_{Holder}$ 220 of the holder 120, the offset 228, and the obtuse angle 272. As the offset 260 increases (e.g., as the radius of curvature of the curved portion 166 becomes smaller), the force on the support arms 142a, 142b at the junction of the bottom bracket with the holder 120 also increases, increasing the strain on the frame. At the same time, if the flat portion 164 is shorter and the curved portion 166 longer, the frame 110 may not stably sit flat when unloaded, tipping backwards with the outside end of the holder rising. Balancing these considerations, the offset 260 is a positive value so that the center of mass of the unloaded frame is over a middle of the flat base 180, such as an offset of approximately one-fifth to one-quarter $d_{C1}$. The distance $d_{C1}$ 252 is the distance along the longitudinal axis from the outer edge of the ring 128 on the inside of the holder 120 to the upper surface contact bar 152.

The frame 100 is illustrated with a plate 190. The plate may be used as a strengthening member or may be decorative (e.g., displaying a brand logo), depending upon the strength of the material and/or plating used.

Figure 4:
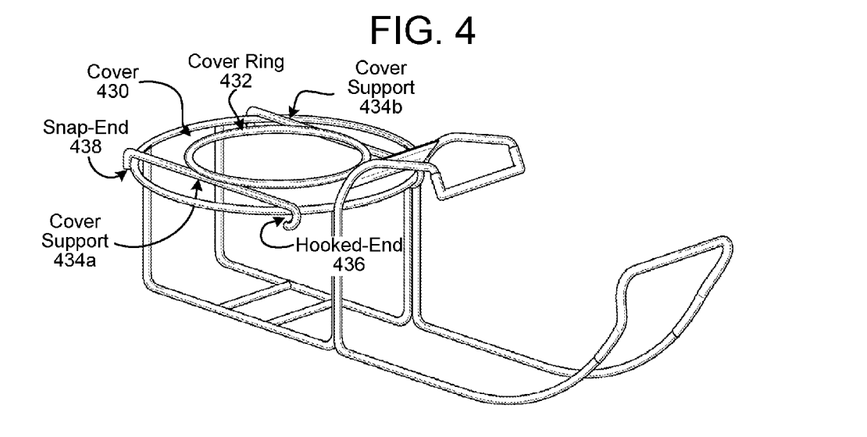
FIG. 4 is a perspective view of the holder of FIG. 1 including a first embodiment of a cover adapted to locate a wine bottle in the holder.
Figure 5:
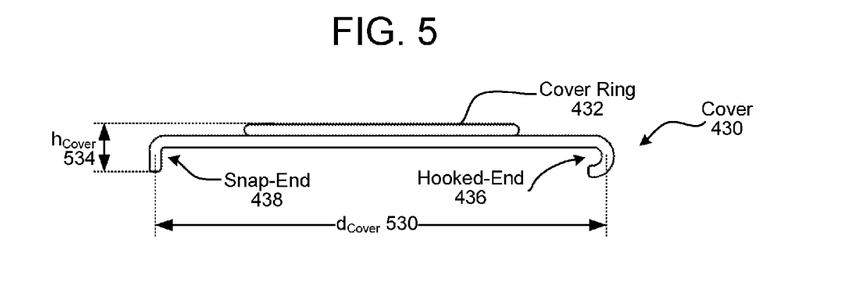
FIG. 5 is a side elevational view of the cover of FIG. 4.
Figure 6:
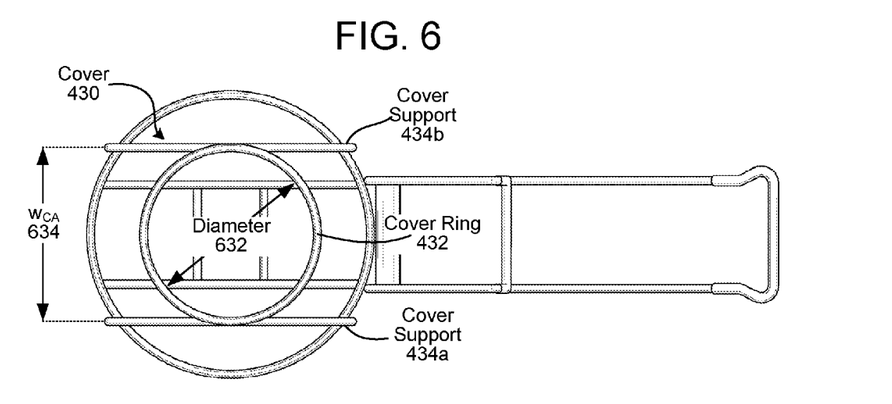
FIG. 6 is a top plan view of the holder and cover of FIG. 4.

FIGS. 4 through 6 illustrate one embodiment of a cover or adapter 430 that may locate and hold a bottle in place in the holder 120. Parallel cover arms 434a, 434b support opposite sides of a cover ring 432 with a diameter (632) sized to envelope the bottle (e.g., a wine bottle). The cover arms 434a, 434b are fixedly connected to the cover ring 434, such as by welds, gluing or the like (or again, the cover 430 could be manufactured as a unitary whole). The same type of bars/rods used to fabricate the frame 100 may also be used to fabricate the cover 430.

Each cover support 434a, 434b has a hooked end 436 designed to removably latch/clasp onto the holder ring 128 of the holder 120. The inner-edge radius of curvature of the hooked-end 436 may be equal to or slightly larger than the cross-sectional radius of the ring 128.

The other end of each cover support 434a, 434b is bent to form a snap-end 438 which secures the cover 430 to the holder ring 128. The bend that forms each snap-end 438 may approximate a right angle (ninety degrees) or a slightly-acute angle (e.g., eighty-five to eight-nine degrees). The length $d_{Cover}$ 530 of the cover is set so that the cover 430 snuggly locks onto the holder ring 128, the cover support 434a, 434b forming parallel secants across the ring 128. Mounted, the holder ring 128 and cover ring 432 may be concentric.

Figure 7:
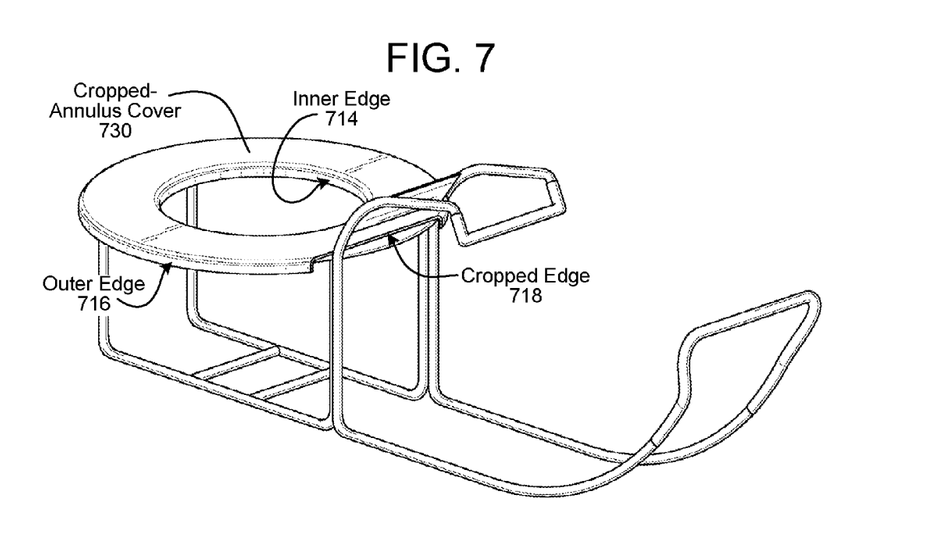
FIG. 7 is a perspective view of the holder of FIG. 1 including a second embodiment of a cover adapted to locate a wine bottle in the holder.
Figure 8:
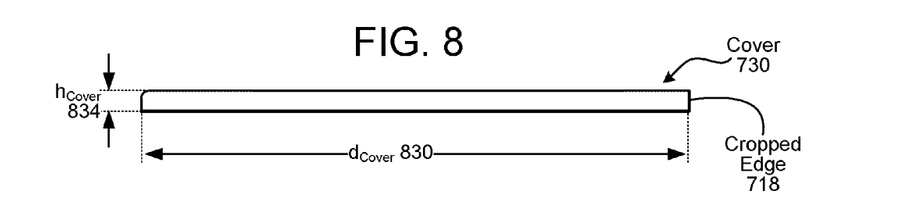
FIG. 8 is a side elevational view of the cover of FIG. 7.
Figure 9:
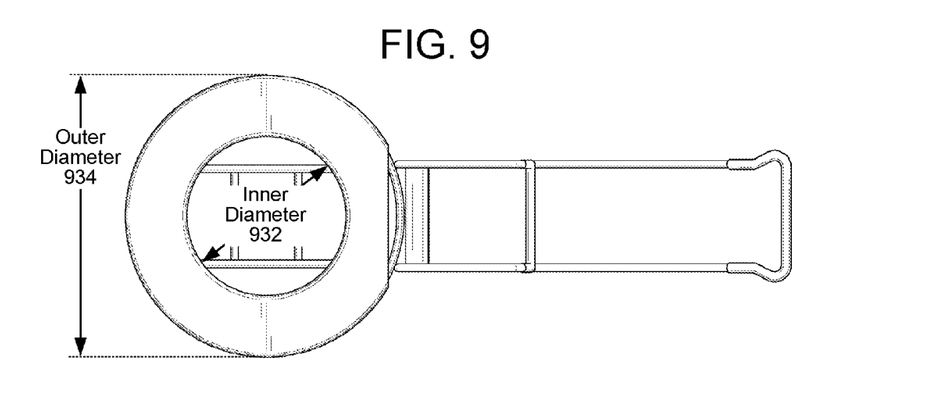
FIG. 9 is a top plan view of the holder and cover of FIG. 7.

As another cover style, FIGS. 7 through 9 illustrate a further embodiment of a cover or adapter 730 that may locate and hold a bottle in place in the holder 120. The cover 730 may be constructed from a shaped, stamped and/or folded metal sheet (e.g., steel or other metal sheeting), may be machined (e.g., machined aluminum), may be molded material (e.g., plastic), etc. The inner edge 714 of the cover 730 may be concentric with the holder ring 128. The outer edge 716 is concentric with the holder ring 128. One edge of the cover is cropped (718) to abut the support arms 142a, 142b of the handle/mount 140.

The inside diameter (932) of the hole is sized to receive the bottle (e.g., a wine bottle) and generally position it in place. The inside "sidewall" diameter of the outer edge 716 is equal to or slightly larger than the outside diameter of the holder ring 128. The outer edge 716 may curve inward to secure the cover 730 to the holder ring 128, such as approximating a slightly-acute angle (e.g., eighty-five to eight-nine degrees). The inside "sidewall" of the outer edge 716 may envelop the holder ring 128, the cover 730 having an approximate height ($h_{Cover}$ 834) equaling or exceeding a thickness of the holder ring 128 plus a thickness of the material used to form the cover 730.

Figure 11:
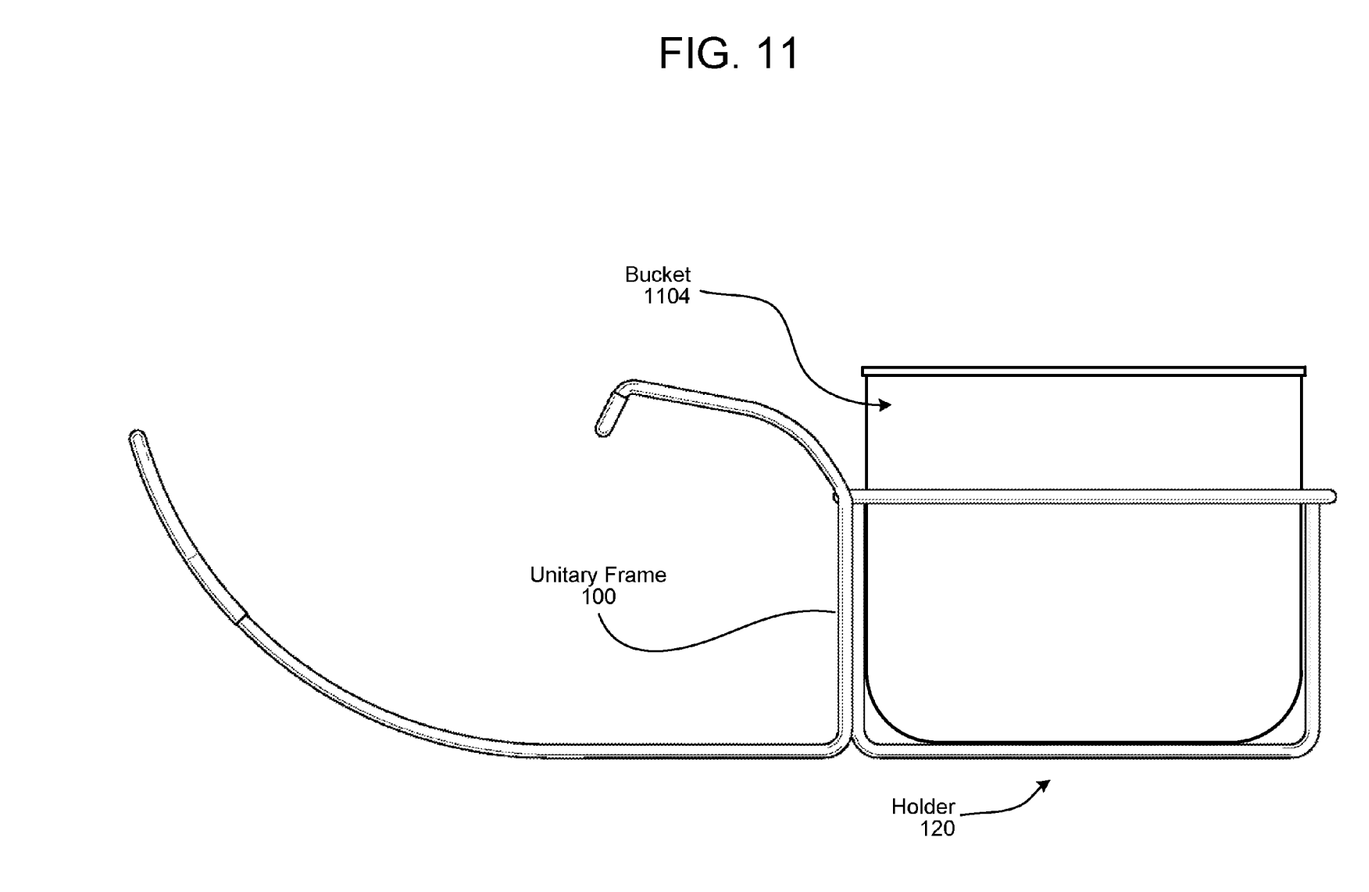
FIG. 11 illustrates the use of the holder of FIG. 1 with a wine bucket located therein.

FIG. 10 illustrates how the frame 100 with a load (bottle 1001) would be applied to a table 1000. Although illustrated with cover 730, cover 430 or no cover may also be used. In addition, the holder 120 may hold a bucket or insulator (as illustrated in FIG. 11).

A conventional ice bucket or insulator 1104 may be nested in the holder 120. This is illustrated in FIG. 11. The bucket or insulator that nests in holder 120 from the top (dropped in through ring 128)

As an example of a specific embodiment of the wine holder (measured unloaded), although the present invention is not to be limited to just such an embodiment, steel rods with a circular cross-section are used to form the frame 100 and have a diameter of 6.00 millimeters to 6.35 millimeters (0.25 inches). The height $h_{Frame}$ 212 of the frame 100 from the bottom of the flat base 180 to the top of the bend 158 of the top bracket 150 is 6.51 inches. The height $h_{Holder}$ 220 from the bottom of the flat base 180 to the top of the holder ring 128 is 4.63 inches. The length $d_{Frame}$ 214 of the frame 100 from one to the other down the longitudinal axis is 20.78 inches. The distance $d_{C1}$ 252 along the longitudinal axis from the outer edge of the ring 128 on the inside of the holder 120 to the upper surface contact bar 152 is 3.97 inches. The vertical height $h_{c1}$ 254 from the top of the rods forming the flat portion 164 to the base of the upper surface contact bar 152 is 5.3 inches. The vertical height $h_{C2}$ 264 from the flat base 180 to the top of the undersurface contact bar 162 is 5.40 inches. The radius of curvature of the first curve 154a is 6.4 inches, and the radius of curvature of the second curve 154b is 2.1 inches. The radius of curvature of the curved portion 166 of the bottom bracket 160 is 7.31 inches. The drop $d_B$ 258 of the top bracket 150 after the bend 158 to the bottom of the upper surface contact bar 152 is 0.78 inches. The diameter 328 of the inside of the holder ring 128 is 8.19 inches. The separation $d_{HA}$ 324 from an outside leg 121 to an inside leg 123, formed by a single support 122a, 122b, is 7.86 inches (rod axis to rod axis). The separation $d_{XB}$ between the cross bars 126 is 2.0 inches (rod axis to rod axis). The width $w_{HA}$ 322 between the holder arms 122a, 122b is 3.00 inches (measured rod axis to rod axis). The width $w_{C1}$ 342 from the inside of one support arm 142a to the other 142b is also 3.00 inches, such that support arms 142a, 142b are spaced further apart than the holder arms 122a, 122b by approximately twice the radius of the rods (e.g., approximately 0.25 inches, with the distance $W_{C2}$ 344 between support arms 142a, 142 measured rod axis to rod axis being approximately 3.25 inches). The flared section 368 of the handle 140 at the undersurface contact bar 162 widens out to a width $w_{C3}$ 362 of 4.05 inches. Each of the six welds 110 securing the holder 120 to the handle 140 are one-eighth inch fillet welds. Weld metal extending beyond the joints (particular any securing the cross bars 126 to the holder arms 122a, 122b and breaking the plane of the flat base 180) may be machined to produce a smooth surface. The length $d_{Cover}$ 530 of the cover arms 434a, 434b of the cover 430 is 8.3 inches (measured rod axis to rod axis). The height $h_{Cover}$ 534 of the cover 430, measured at the snap-end 438, is 0.96 inches. The inside diameter 632 of the cover ring 432 is 3.5 inches. The separation $W_{CA}$ 634 between the cover support 434a and cover support 434b is 3.7 inches (measured rod axis to rod axis). The annulus cover is stainless steel sheeting with a thickness of approximately 0.036 inches. The length $d_{Cover}$ 830 of the annulus cover 730 is 8.26 inches, measured from the cropped edge 718 across a center of the annulus. The height of the annulus cover $h_{Cover}$ 834 is 0.31 inches. The inner diameter 932 of the annulus cover 730 is 3.5 inches. The outer diameter 934 of the annulus is 8.8 inches.

The general description and specific embodiment of the present disclosure are meant to be illustrative. They were chosen to explain the principles and application of the frame 100 and are not intended to be exhaustive or to limit the disclosure. Modifications and variations of the disclosed features may be apparent to those of skill in the art. Although welded metal rods are the example provided for construction of the frame 100 and cover 430, the benefits of the form and structure of the unitary frame 100 may be obtained using other materials and construction methods, such as bars having a different cross-sectional shape than circular rods, while retaining the functional benefits of the structural design.

As used in this disclosure, the term "a" or "one" may include one or more items unless specifically stated otherwise. Further, the phrases "connected," "coupled," "joined," and "fixedly connected" are interchangeable within the context of the structure of the unitary frame 100 and mean that connected pieces are inseparably bonded, monolithic, welded, etc., unless specifically stated otherwise.

What is claimed is:

1. A table-mountable server comprising:
a unitary frame, the unitary frame having a flat base and comprising a holder portion connected to a mount-portion,
the holder portion comprising:
a ring;
a first support comprising a first inside leg, a first outside leg, and a first base section, each of the first inside leg and the first outside leg connected at one end to the ring and connected at the other end to respective ends of the first base section, the first base section forming part of the flat base;
a second support, laterally spaced from the first support and comprising a second inside leg, a second outside leg, and a second base section, each of the second inside leg and the second outside leg connected at one end to the ring and connected at the other end to respective ends of the second base section, the second base section forming part of the flat base; and
at least one crossbar, each crossbar connected at one end to the first support and at the other end to the second support; and
the mount portion comprising:
a first arm partially abutting and connected to the first inside leg, the first arm comprising a first top bracket portion, a first section, a first flat portion, and a first curved portion, wherein:
the first top bracket portion connects the first section to a first end of the first arm,
the first section abuts and connects to the first inside leg, and connects the first bracket portion to the first flat portion,
the first flat portion connects the first section to the first curved portion, and forms part of the flat base, and
the first curved portion connects the first flat portion to a second end of the first arm;
a second arm, laterally spaced from the first arm, partially abutting and connected to the second inside leg, the second arm comprising a second top bracket portion, a second section, a second flat portion, and a second curved portion, wherein:
the second top bracket portion connects the second section to a first end of the second arm,
the second section abuts and connects to the second inside leg, and connects the second bracket portion to the second flat portion,
the second flat portion connects the second section to the second curved portion, and forms part of the flat base, and
the second curved portion connects the second flat portion to a second end of the second arm;
a top bracket extending away from the ring of the holder portion, comprising a first contact bar, the first top bracket portion, and the second top bracket portion, wherein the first contact bar connects the first end of the first arm to the first end of the second arm; and
a bottom bracket extending away from the holder portion, comprising a second contact bar, the first and second flat portions, and the first and second curved portions, wherein the first and second curved portions curve away from the flat base, and the second contact bar connects the second end of the first arm to the second end of the second arm,
wherein the bottom bracket extends further away from the holder portion than the top bracket.

2. The table-mountable server of claim 1, wherein the ring, the first support, the second support, the at least one crossbar, the first arm, the second arm, the first contact bar, and the second contact bar are composed of metal bars with circular cross-sections.

3. The table-mountable server of claim 2, wherein the first arm is connected to the first inside leg by a first plurality of welds, and the second arm is connected to the second inside leg by a second plurality of welds.

4. The table-mountable server of claim 1, wherein a first distance between the first contact bar and the second contact bar is approximately equal to a diameter of the ring.

5. The table-mountable server of claim 4, wherein a second distance between the first contact bar and an edge of the ring nearest to the mount portion is approximately one-half the diameter of the ring.

6. The table-mountable server of claim 1, wherein:
the first base section of the first support of the holder forming part of the flat base is parallel to the second base section of the second support of the holder forming part of the flat base, and
the first flat portion of the first arm that forms part of the flat base is parallel to the second flat portion of the second arm that forms part of the flat base.

7. The table-mountable server of claim 1, wherein the first contact bar and the second contact bar are coated with a nonslip material.

8. The table-mounted server of claim 7, wherein the nonslip material is selected from the group consisting of natural rubber, synthetic rubber, latex, vinyl, elastic polymer, and silicone.

9. The table-mountable server of claim 1, wherein the first arm and the second arm flare outwards proximate to the second ends, a length of the second contact bar being longer than a distance between the first arm and the second along the flat base.

10. The table-mountable server of claim 1, wherein a first distance from the first contact bar of the top bracket to the flat base is greater than a second distance from the ring of the holder portion to the flat base.

11. The table-mountable server of claim 1, wherein proximate to the first ends, the first arm and the second end bend toward the bottom bracket.

12. The table-mountable server of claim 1, wherein proximate to the second ends, the first arm and the second arm are oriented at an obtuse angle relative to a plane of the flat base.

13. The table-mountable server of claim 1, further comprising a cover attached to the ring of the holder portion, the cover comprising:
a cover ring that is concentric with the ring of the holder portion; and
a first cover arm and a second cover arm, symmetric to each other and connected to opposite sides of the cover ring.

14. The table-mountable server of claim 13, wherein the cover is adapted to be removable from the ring of the holder portion, each of the first cover arm and the second cover arm having a first end that is hooked to clasp around an outside of the ring of the holder portion, and a second end that is bent to secure an opposite side of the cover to the ring of the holder portion.

15. The table-mountable server of claim 1, further comprising a cover attached to the ring of the holder portion, the cover comprising:
a disk-shaped lid having a middle hole concentric with the ring of the holder portion and sized to receive and locate a bottle standing vertically within the holder portion, the disk-shaped lid abutting the top bracket of the holder portion; and
an outer edge having one or more depending parts engaging the ring for removably attaching the cover to the holder portion.

16. The table-mountable server of claim 1, further comprising a bucket that is received in the holder portion between the inside and outside legs.

17. The table-mountable server of claim 1, further comprising a bucket that removably nests between the inside and outside legs through the ring of the holder portion.

18. A table-mountable server comprising:
a frame, the frame having a holder portion connected to a mount portion,
the holder portion comprising:
an upper ring;
a base spaced under the ring and connected to the ring, the base presenting a generally level interior surface to support an article placed thereon, with a first support member comprising a first inside leg and a first outside leg and a second support member, laterally spaced from the first support member, comprising a second inside leg and a second outside leg, with each leg connected to the ring on opposed sides thereof; and
at least one crossbar, each crossbar connected at one end to the first support and at the other end to the second support; and
the mount portion comprising:
a first arm partially abutting and connected to the first inside leg;
a second arm, laterally spaced from the first arm, partially abutting and connected to the second inside leg;
a top bracket which is adapted to engage an upper surface of a table in use, comprising upper portions of the first arm and the second arm extending away from the ring of the holder portion and terminating in a first contact part which is adapted to engage the upper surface in use; and
a bottom bracket which is adapted to engage a lower surface of the table in use, comprising lower portions of the first arm and the second arm extending away from the holder portion and terminating in a second contact part which is adapted to engage the lower surface in use, the bottom bracket extending further away from the holder portion than the top bracket such that the holder portion is to be suspended in a cantilever fashion from the table when the table-mountable server is engaged with the table.

19. The table-mountable server of claim 18, further comprising a cover attached to the ring of the holder portion, the cover comprising:
a cover ring that is concentric with the ring of the holder portion; and
a first cover arm and a second cover arm, symmetric to each other and connected to opposite sides of the cover ring.

20. The table-mountable server of claim 18, further comprising a cover attached to the ring of the holder portion, the cover comprising:
a disk-shaped lid having a middle hole concentric with the ring of the holder portion and sized to receive and locate a bottle standing vertically within the holder portion, the disk-shaped lid abutting the top bracket of the holder portion; and
an outer edge having one or more depending parts engaging the ring for removably attaching the cover to the holder portion.

21. The table-mountable server of claim 18, wherein the first and second inside legs extend generally straight downwardly from the ring, and the first and second arms extend generally along an entire length of the first and second inside legs, with the inside legs and the first and second arms rigidly attached at one or more points along the entire length.

* * * * *